(12) United States Patent
Ogasawara et al.

(10) Patent No.: US 8,045,041 B2
(45) Date of Patent: Oct. 25, 2011

(54) MULTI-LAYER SOLID STATE IMAGING DEVICE

(75) Inventors: Shinya Ogasawara, Hyogo (JP); Yukihiro Iwata, Osaka (JP); Miyoko Irikiin, Hyogo (JP)

(73) Assignee: Panasonic Corporation, Osaka (JP)

( * ) Notice: Subject to any disclaimer, the term of this patent is extended or adjusted under 35 U.S.C. 154(b) by 528 days.

(21) Appl. No.: 12/211,994

(22) Filed: Sep. 17, 2008

(65) Prior Publication Data

US 2009/0073303 A1 Mar. 19, 2009

(30) Foreign Application Priority Data

Sep. 19, 2007 (JP) .................................. 2007-241947

(51) Int. Cl.
*H04N 9/07* (2006.01)
*H04N 5/225* (2006.01)

(52) U.S. Cl. ..................... 348/336; 348/335; 348/337

(58) Field of Classification Search .................. 348/336, 348/337

See application file for complete search history.

(56) References Cited

U.S. PATENT DOCUMENTS

| | | | | |
|---|---|---|---|---|
| 6,380,007 | B1 * | 4/2002 | Koyama | 438/151 |
| 7,345,349 | B2 * | 3/2008 | Yamamoto et al. | 257/433 |
| 7,582,943 | B2 * | 9/2009 | Fukunaga et al. | 257/432 |
| 2001/0055073 | A1 * | 12/2001 | Shinomiya | 348/374 |
| 2005/0258502 | A1 * | 11/2005 | Kong et al. | 257/433 |
| 2009/0251569 | A1 * | 10/2009 | Nonaka | 348/240.1 |

FOREIGN PATENT DOCUMENTS

| | | |
|---|---|---|
| JP | 1-295575 | 11/1989 |
| JP | 5-145207 | 6/1993 |
| JP | 5-284412 | 10/1993 |
| JP | 10-210221 | 8/1998 |
| JP | 11-125516 | 4/1999 |
| JP | 2001-308569 | 11/2001 |
| JP | 2002-247594 | * 8/2002 |
| JP | 2003-224368 | 8/2003 |

* cited by examiner

*Primary Examiner* — Lin Ye
*Assistant Examiner* — John H Morehead, III
(74) *Attorney, Agent, or Firm* — Wenderoth, Lind & Ponack, L.L.P.

(57) ABSTRACT

An image pickup device includes a color separation prism composed of prism members and which separates light into color components, solid-state image sensors fixed to the prism members, respectively, image sensor boards on which the solid-state image sensors are mounted, respectively, an image control board to which image pickup signals generated by the image sensor boards, respectively, are inputted, and a flexible board which is connected to the image control board. The flexible board includes a signal transmission layer connected to each of the image sensor boards and which contains transmission paths for transmitting the image pickup signals to the image control board, and a heat radiating layer formed of a high heat conductivity material which is connected to each of the solid-state image sensors and fixed to the signal transmission layer via an insulating layer to transfer heat generated in the solid-state image sensors.

3 Claims, 5 Drawing Sheets

Fig. 1 - PRIOR ART

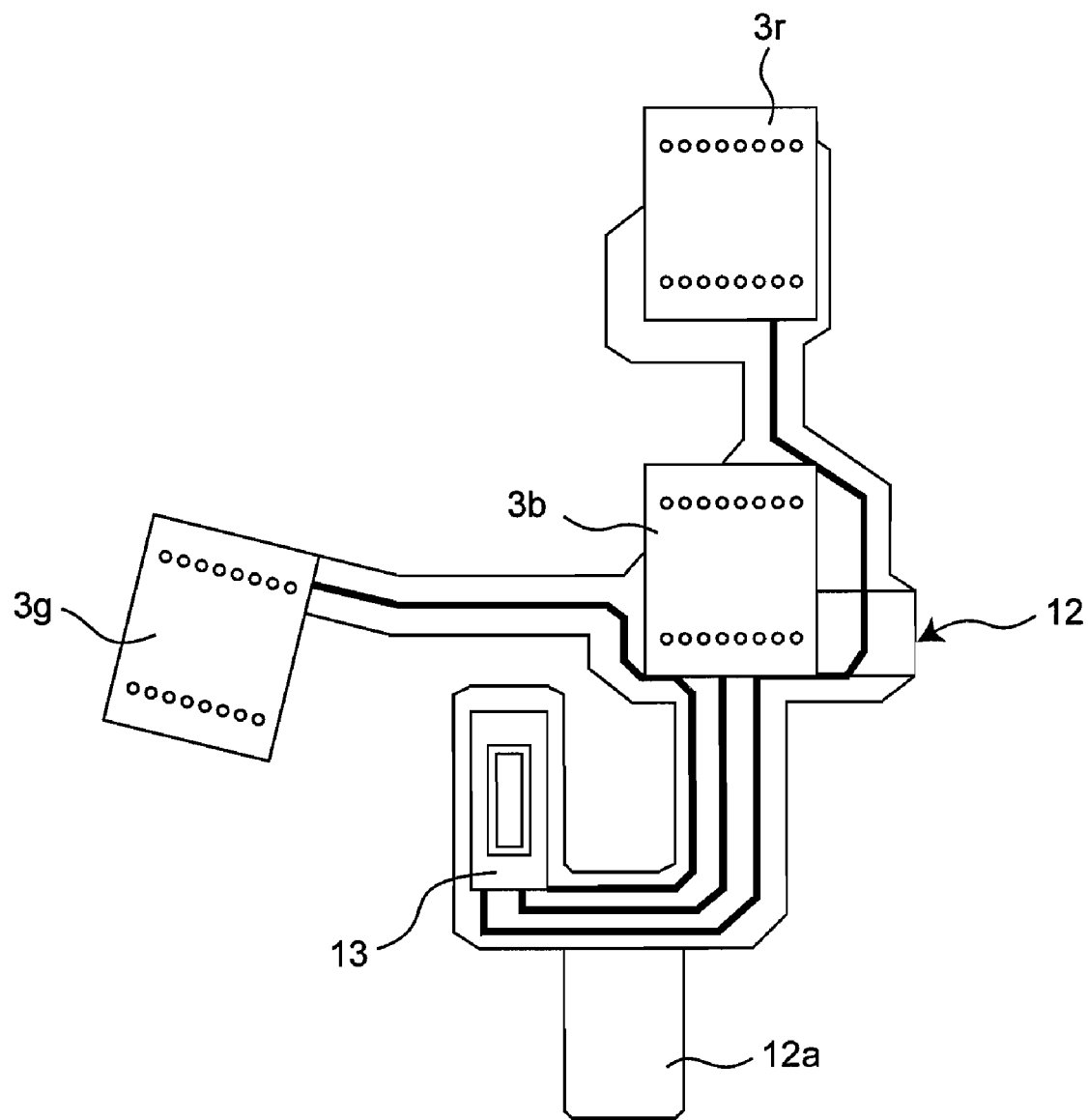

MULTI-LAYER SOLID STATE IMAGING DEVICE

BACKGROUND OF THE INVENTION

1. Field of the Invention

The present invention relates to image pickup devices, such as television cameras and video cameras, equipped with solid-state image sensors.

2. Description of Related Art

In recent years, there have been developed, and now in widespread use, 3CCD color cameras (hereinafter, referred to as 3CCD cameras) as image pickup devices using three solid-state image sensors. The structure of such a conventional 3CCD camera is explained below with reference to the accompanying drawings.

FIG. 1 is a schematic sectional view of an image pickup block 10 in a conventional 3CCD camera. As shown in FIG. 1, the image pickup block 10 includes a color separation prism for separating incident light, which has come up through an unshown image pickup lens of the 3CCD camera, into specified color components, a plurality of solid-state image sensors, and image sensor boards on which the solid-state image sensors are mounted, respectively.

As shown in FIG. 1, the color separation prism is made up of three prism members 1r, 1g, 1b, which are bonded together in close contact with one another. The color separation prism constructed like this is a three color separation prism 1 for separating incident light into three color components. Bonded interfaces on the prism members 1r, 1g, 1b serve as dichroic mirrors 4, 5. On light-outgoing surfaces of the three prism members 1r, 1g, 1b, solid-state image sensors 2r, 2g, 2b are fixed individually with adhesive.

Referring to FIG. 1, a light beam 7 incident on the three color separation prism 1 is separated by the dichroic mirrors 4, 5 into three color components, i.e. light beams 6a, 6b, 6c of three primary colors of light, and the resultant light beams are received by their corresponding solid-state image sensors 2r, 2g, 2b, respectively. Out of the light beams separated into the three primary colors and reflected by the dichroic mirrors 4, 5, the light beams 6a, 6b are totally reflected again within the prism members 1g, 1b, respectively, thereby being received by the solid-state image sensors 2g, 2b as light beams that form not a mirror image (reflected image) but a non-mirror image. Image pickup signal processing against the individual light beams received by the solid-state image sensors 2g, 2b, 2r, respectively, is performed by the image sensor boards 3r, 3g, 3b, respectively, so that a color television signal in which the image pickup signals are composited is obtained.

For the conventional 3CCD camera having such a structure described above, there is a need for achieving high-accuracy superimposition of three-color subject images. Poor accuracy of superimposition, i.e. poor accuracy of registration, would lead to occurrence of color differences or moire false signals, resulting in a subtly deteriorated image. Accordingly, in order to prevent any deterioration of registration accuracy, there is a need for reducing external-force loads applied to the respective solid-state image sensors 2r, 2g, 2b.

Further, if used under a high-temperature environment, a solid-state image sensor would incur image quality deterioration due to white scratches, life reduction and so on, and therefore needs to be used at a specified temperature or lower. Particularly in recent years, in image pickup devices typified by 3CCD cameras on which solid-state image sensors are mounted, there is a tendency that the ambient temperature of the solid-state image sensors (i.e., internal temperature within the device casing) increases more and more with increasing power consumption that can be attributed to light, thin, short and small dimensions and more multiple and higher functions of the device, making it indispensable to provide a means for cooling the solid-state image sensors.

Therefore, in conventional image pickup devices, there have been proposed various heat radiating structures for efficiently cooling solid-state image sensors while reducing the external-force loads applied to the solid-state image sensors (see, e.g., Document 1: JP H1-295575 A, Document 2: JP 2002-247594 A, and Document 3: JP 2001-308569 A).

First, Document 1 discloses a heat radiating structure in which a thermoelectric cooling device mounted on a heat transfer member by screws is placed so as to be in contact with the back face of each solid-state image sensor. In such a heat radiating structure, since deformations due to thermal expansion and thermal contraction of each member can be absorbed by backlashes of the screws, forces due to the thermal deformations can be prevented from being applied from the cooling device to the solid-state image sensor.

Also, Document 2 proposes a heat radiating structure in which a thermoelectric cooling device fixed to a heat conducting plate is so placed as to be put into close contact with the back faces of the solid-state image sensors with proper force by utilizing the elasticity of the heat conducting plate. In such a heat radiating structure, since the cooling device can be put into close contact with the back faces of the solid-state image sensors by utilizing the elasticity of the heat conducting plate, there can be realized an efficient heat radiation.

Document 3 proposes a heat radiating structure using no thermoelectric cooling device in which one end of a metallic component is inserted between the back face of a solid-state image sensor and the image sensor board while the other end of the metallic component is fixed to a metal frame so that heat transferred from the solid-state image sensor to the metallic component is allowed to escape to the metallic component.

SUMMARY OF THE INVENTION

In recent years, the positioning of individual solid-state image sensors in such a 3CCD camera has been under a demand for accuracy on the order of μm. For example, the positioning of the individual solid-state image sensors 2r, 2g, 2b, as it stands, has been coming to require accuracies on the order of several tens of μm for the positioning in the optical axis direction because of a depth of focus, and on the order of μm for that of the in-plane direction of the subject image.

However, in the heat radiating structure of Document 1, since external forces are absorbed by the backlashes of the screws, external forces caused by small thermal deformations cannot be absorbed enough. Therefore, depending on the magnitude of an external force that acts on the solid-state image sensors, the external force may affect the positioning accuracy of those image sensors, giving rise to an issue of deterioration of registration accuracy due to positional shifts. Also, in the heat radiating structure of Document 2, since external forces are applied to the solid-state image sensors by elasticity of the heat conducting plate and the external forces vary depending on thermal expansion or the like, there are cases where the positioning accuracy is affected by the external forces. Furthermore, in the heat radiating structures of Documents 1 and 2, since relatively expensive thermoelectric cooling devices are used, the cost of the image pickup device goes up.

Even in the heat radiating structure of Document 3 using no cooling devices, since the metallic component whose one end is fixed to the metal frame is placed so as to be in contact with the back faces of the solid-state image sensors, a load due to springback caused by thermal expansion and contraction of the metallic member is applied to the solid-state image sensors through the contact end portion on the solid-state image sensors. This results in occurrence of positional shifts at bonding surfaces between the solid-state image sensors and the prism members, giving rise to an issue of deterioration of registration accuracy due to the positional shifts. Furthermore, any one of the heat radiating structures of Documents 1 to 3 is complicated in structure, and not simple to attach or handle.

Moreover, there has been widely used a technique of fixing bonding surfaces of the solid-state image sensors 2r, 2g, 2b, in which, with the use of UV adhesive (ultraviolet curable adhesive) for the bonding between front faces of the solid-state image sensors 2r, 2g, 2b and the prisms 1r, 1g, 1b, the solid-state image sensors 2r, 2g, 2b are position controlled (for six axes) after the adhesive is applied to between their bonding surfaces, and ultraviolet radiation is applied thereto to cure the adhesive.

However, since such UV adhesive has a high temperature creep property (a property of creeping due to continued application of a load under a high temperature environment), the load due to the springback of the metallic component or the like becomes a serious matter particularly as the ambient temperature of the solid-state image sensors 2r, 2g, 2b (i.e., internal temperature within the device casing) becomes higher.

Accordingly, an object of the present invention, lying in solving the above-described issues, is to provide an image pickup device including solid-state image sensors which device is capable of suppressing temperature increases of its solid-state image sensors while reducing external-force loads applied to the solid-state image sensors with a relatively simple structure.

In order to achieve the above object, the present invention has the following constitutions.

According to a first aspect of the present invention, there is provided an image pickup device comprising:

a color separation prism made up of a plurality of prism members, for separating light into a plurality of color components;

a plurality of solid-state image sensors fixed to the plurality of prism members, respectively;

a plurality of image sensor boards on which the plurality of solid-state image sensors are mounted, respectively;

an image control board to which image pickup signals generated by the plurality of image sensor boards, respectively, are inputted; and a flexible board connected to the image control board, wherein the flexible board comprises:

a signal transmission layer which is connected to each of the plurality of image sensor boards and which forms transmission paths for transmitting the image pickup signals to the image control board;

a heat radiating layer, formed of a high heat conductivity material, which is put into contact with each of the plurality of solid-state image sensors to transfer heat generated in the solid-state image sensors from the image sensors; and an insulating layer which is placed interveniently between the signal transmission layer and the heat conduction layer to fix the signal transmission layer and the heat conduction layer to each other.

According to a second aspect of the present invention, there is provided the image pickup device as defined in the first aspect, wherein the flexible board further comprises a protective layer fixed to surfaces of the signal transmission layer and the heat conduction layer, respectively.

According to a third aspect of the present invention, there is provided the image pickup device as defined in the second aspect, wherein end portions of the flexible board are placed between the solid-state image sensors and the image sensor boards having the solid-state image sensors mounted thereon, respectively, at the end portions of the flexible board, the signal transmission layer exposed from the protective layer is connected to each of the plurality of image sensor boards and moreover the heat conduction layer exposed from the protective layer is put into contact with each of the plurality of solid-state image sensors.

According to a fourth aspect of the present invention, there is provided the image pickup device as defined in the third aspect, wherein the heat conduction layer is connected to a casing of the image pickup device.

According to the present invention, since the flexible board is formed so as to contain a heat conduction layer, heat generated in the solid-state image sensors can be transferred to the heat conduction layer so that temperature increases of the solid-state image sensors can be suppressed. Further, since the flexible board has a structure in which the signal transmission layer and the heat conduction layer are formed integrally, the flexible board can be reduced in its total thickness, as compared with cases in which the individual layers are provided independent of one another. As a result of this, stress loads of springbacks or the like added to the solid-state image sensors can be decreased remarkably. Accordingly, there can be provided an image pickup device which is capable of reducing stress loads applied to the solid-state image sensors and therefore suppressing deterioration of registration accuracy, while ensuring necessary heat radiation performance, with a relatively simple structure.

BRIEF DESCRIPTION OF THE DRAWINGS

These and other aspects and features of the present invention will become clear from the following description taken in conjunction with the preferred embodiments thereof with reference to the accompanying drawings, in which:

FIG. 5 is a schematic view showing a state in which the hybrid-functional flexible board is connected to the respective image sensor boards.

DETAILED DESCRIPTION OF THE PREFERRED EMBODIMENTS

Figure 1:
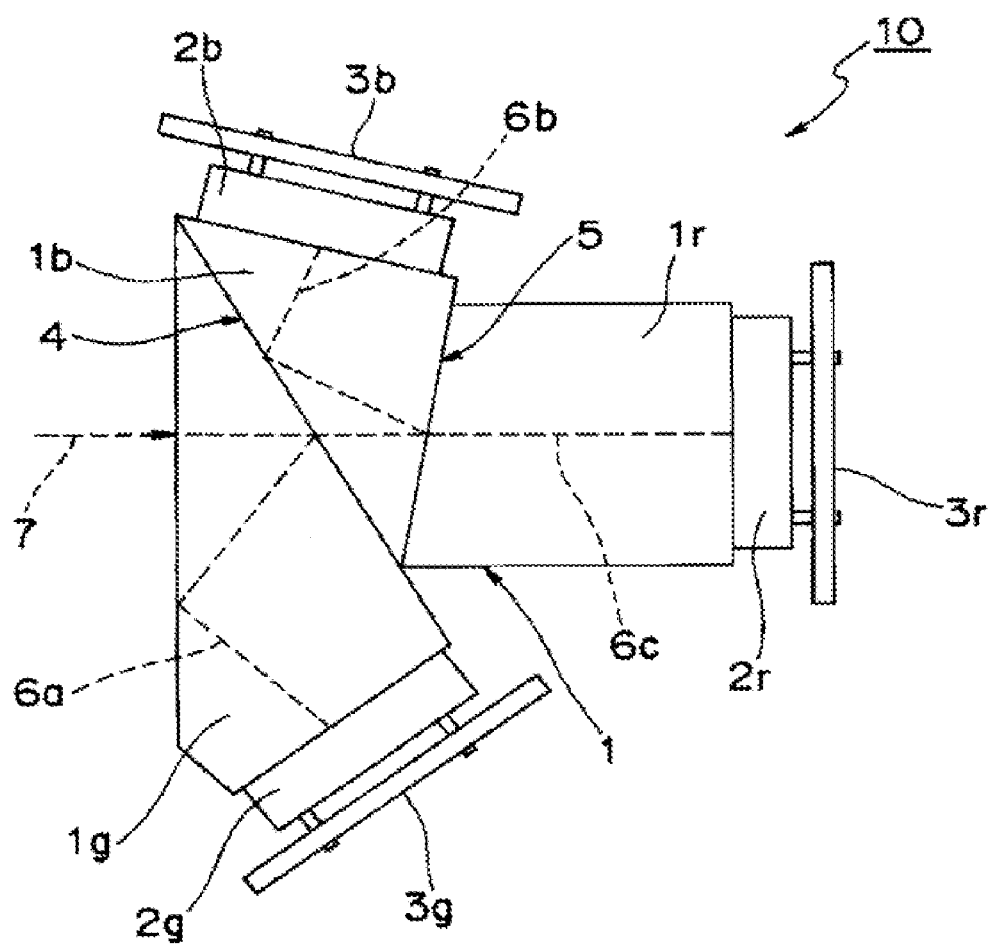
FIG. 1 is a schematic view of an image pickup block in a conventional 3CCD color camera.

Before the description of the present invention proceeds, it is to be noted that like parts are designated by like reference numerals throughout the accompanying drawings.

Hereinbelow, an embodiment according to the present invention will be described in detail with reference to the accompanying drawings.

Figure 2:
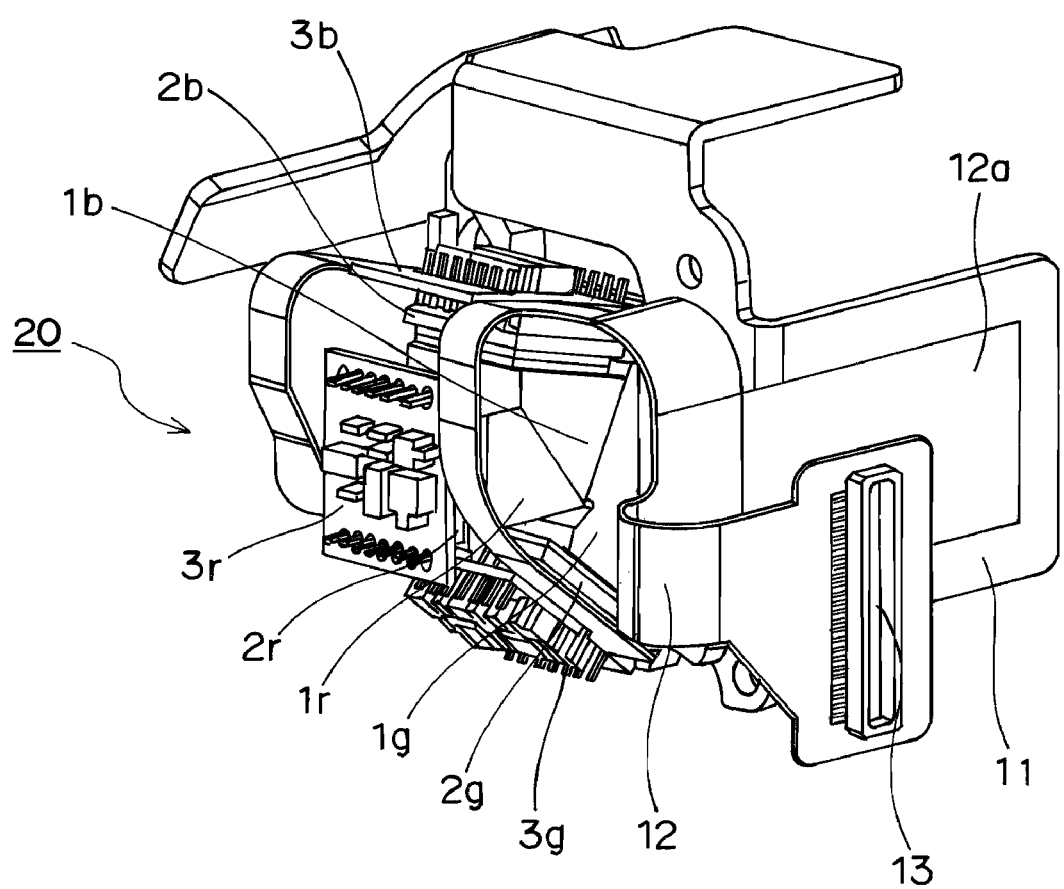
FIG. 2 is a schematic perspective view of an image pickup block to be mounted on an image pickup device according to an embodiment of the present invention.

FIG. 2 shows a schematic perspective view of an image pickup block 20 in a 3CCD camera as an example of the image pickup device equipped with a solid-state image pickup device in which solid-state image sensors and a prism are bonded together according to the embodiment of the present invention. As shown in FIG. 2, the image pickup block 20 of this embodiment is so structured that three prism members 1r, 1g, 1b are bonded together via adhesive and moreover individual solid-state image sensors 2r, 2g, 2b are bonded via adhesive to those prism members 1r, 1g, 1b, respectively. It is noted that the image pickup block 20 is similar in structure to the image pickup block 10 of FIG. 1, and so like component members are designated by like reference numerals and their description is omitted.

Here is explained an image pickup device equipped with the image pickup block 20 having such a structure as shown in FIG. 2. The image pickup device of this embodiment includes the image pickup block 20, a frame 11 being a structure to which the image pickup block 20 is fixed and held, the frame 11 being an example of the casing (or chassis) of the image pickup device, and a lens barrel (not shown) in which an image pickup optical axis is placed inside thereof and to which the frame 11 is fixed and held so that the image pickup optical axis and an optical axis of the image pickup block 20 coincide with each other.

Next, as shown in FIG. 2, a hybrid-functional flexible board 12 having a high heat conductivity material is used in the image pickup block 20 to be mounted on the image pickup device of this embodiment. The hybrid-functional flexible board 12 of this embodiment is a flexible board having composite functions including a signal transfer function of transferring electric signals, which function is provided in so-called flexible boards typified by, for example, FFCs (Flexible Flat Cables) or FPCs (Flexible Printed Circuits) or the like, as well as an additional function of transferring heat.

Figure 3:
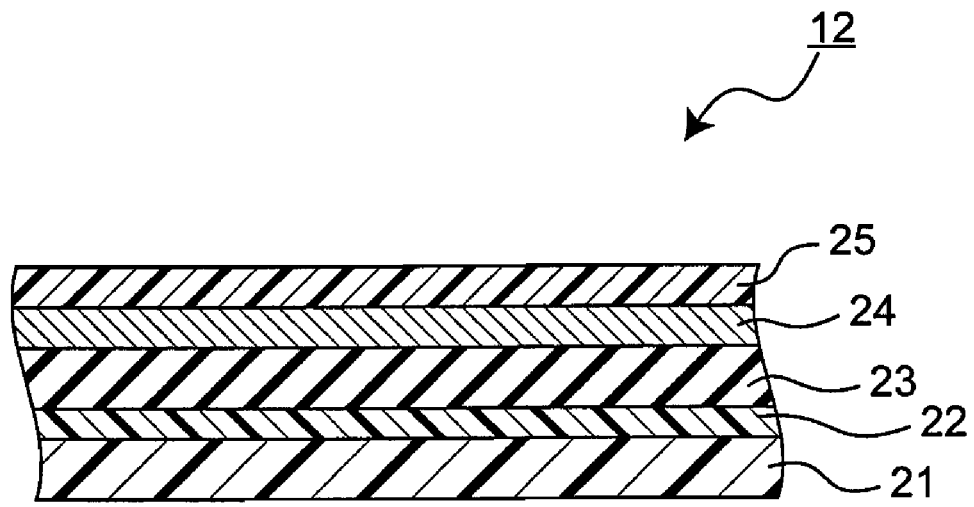
FIG. 3 is a schematic sectional view of a hybrid-functional flexible board in the embodiment.

Referring now to FIG. 3, which shows a schematic sectional view for explaining the structure of the hybrid-functional flexible board 12 in this embodiment, the hybrid-functional flexible board 12 of this embodiment is explained below. As shown in FIG. 3, the hybrid-functional flexible board 12 is formed of a five-layer structure of a cover layer 21, a heat conduction layer 22, an insulating layer 23, a signal transmission layer 24 and a film cover layer 25.

The cover layer 21 (an example of a protective layer), which is a base that constitutes the hybrid-functional flexible board 12, is formed of, for example, an insulative member.

The heat conduction layer 22 is provided by using a high heat conductivity material such as a copper or graphite sheet having low rigidity and high thermal conductivity, so that the heat conduction layer 22 conducts heat. The heat conduction layer 22 is formed on top of the cover layer 21.

The insulating layer 23 is placed intervenieintly between the heat conduction layer 22 and the signal transmission layer 24, and formed by an insulative member so as to insulate the heat conduction layer 22 and the signal transmission layer 24 from each other.

The signal transmission layer 24 is formed of a material containing a conductor material. More specifically, the signal transmission layer 24 is formed of, for example, foil-like copper so as to contain transmission paths that function as interconnection lines for transmitting image pickup signals. In the signal transmission layer 24, image pickup signals generated by the respective image sensor boards 3r, 3g, 3b are transmitted through the transmission paths. In addition, the signal transmission layer 24 is not limited to such a case where conductor interconnections for transmitting image pickup signals are formed therein, and circuits for performing other specified signal processing may also be formed therein.

The film cover layer 25 (an example of a protective layer) is formed on top of the signal transmission layer 24. The film cover layer 25 is formed of, for example, an insulative member so as to protect the top surface of the signal transmission layer 24.

In the hybrid-functional flexible board 12, it is noted that the cover layer 21, the heat conduction layer 22, the insulating layer 23, the signal transmission layer 24 and the film cover layer 25 are bonded to one another via, for example, adhesive, and are formed so as to have flexibility as an integrated sheet-like member. For example, the cover layer 21 is formed so as to be 0.2 mm or less thick, the heat conduction layer 22 is 0.2 mm or less thick, the insulating layer 23 is 0.2 mm or less thick, the signal transmission layer 24 is 0.1 mm or less thick, and the film cover layer 25 is 0.2 mm or less thick.

Figure 4:
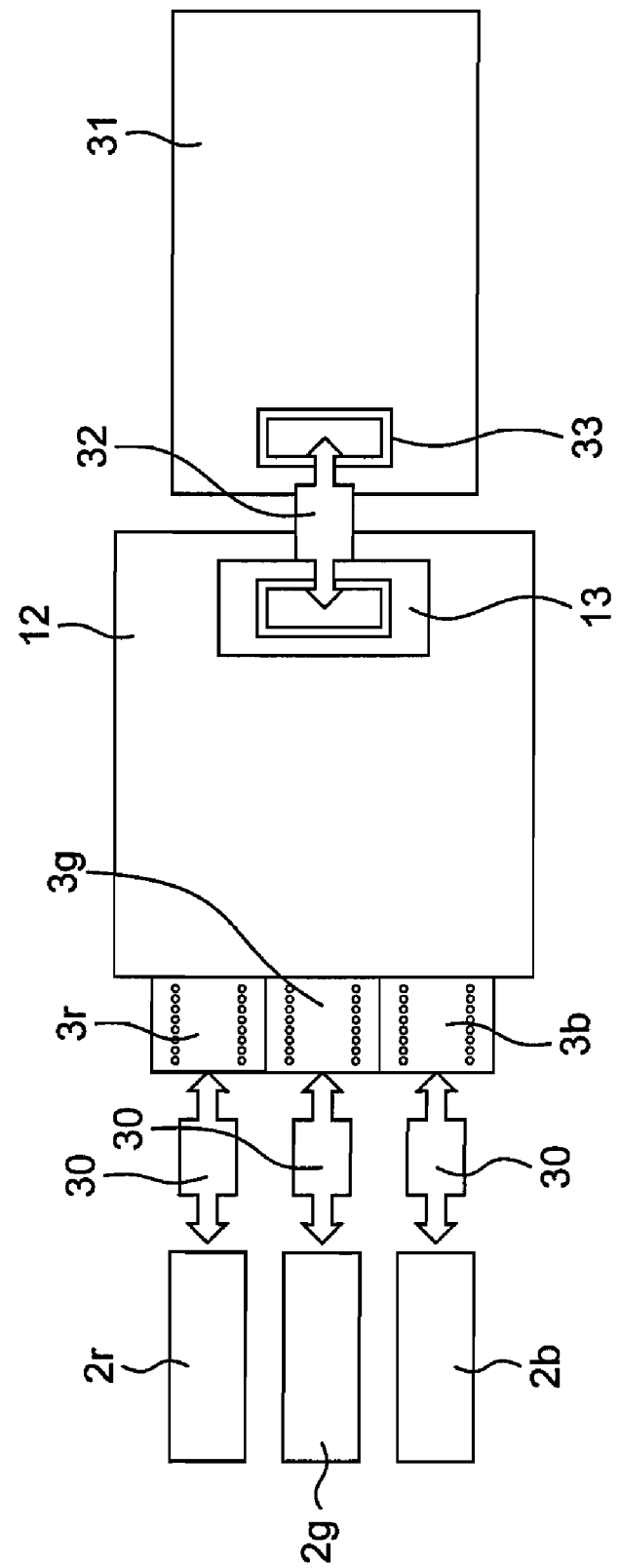
FIG. 4 is a schematic view for explaining connection destinations of the hybrid-functional flexible board.

FIG. 4 shows a schematic view for explaining connection destinations of the hybrid-functional flexible board 12, and FIG. 5 shows a schematic view in which the hybrid-functional flexible board 12 and the respective image sensor boards 3r, 3g, 3b are connected. Referring to FIGS. 2, 4 and 5, connection destinations of the hybrid-functional flexible board 12 of this embodiment are explained below.

As shown in FIG. 2, there are formed clearances between the solid-state image sensors 2r, 2g, 2b and the image sensor boards 3r, 3g, 3b having those solid-state image sensors 2r, 2g, 2b mounted thereon, respectively (hereinafter, referred to as between the solid-state image sensors and the image sensor boards). Into these clearances, three-branched end portions of the hybrid-functional flexible board 12 (see FIGS. 2 and 5; the branched portions are omitted in illustration of FIG. 4) are inserted and placed individually. At the end portions of the hybrid-functional flexible board 12 placed into the clearances as shown above, terminal portions of the signal transmission layer 24 are exposed from the film cover layer so that the exposed end portions of the signal transmission layer 24 are electrically connected to the image sensor boards 3r, 3g, 3b, respectively, by soldering as an example. Further, at the end portions of hybrid-functional flexible board 12 placed within the clearances, the heat conduction layer 22 is exposed from the cover layer 21 so that the exposed end portions of the heat conduction layer 22 are in direct contact with back faces (surfaces opposite to light-receiving surfaces for light beams) of the solid-state image sensors 2r, 2g, 2b, with the resulting contact state retained.

Furthermore, as shown in FIG. 4, a connector 13 is electrically connected to the signal transmission layer in the hybrid-functional flexible board 12. This connector 13 is connected via, for example, a cable 32 (see FIG. 4) to a connector 33 connected to an image control board 31 which is so formed as to contain an image processing circuit for processing image pickup signals of image information acquired by the solid-state image sensors. As a result, from light beams received by the solid-state image sensors 2r, 2g, 2b, image pickup signals are generated by the image sensor boards 3r, 3g, 3b, respectively, and those image pickup signals are transmitted through the transmission paths contained in the signal transmission layer 24 so as to be inputted to the image control board 31.

Also, the hybrid-functional flexible board 12, as shown in FIG. 5, is further branched halfway on the route of connection to the connector 13, and the branched route (branched portion) 12a is connected to the frame 11. In the hybrid-functional flexible board 12, the branched portion 12a is formed in a three-layer structure of the cover layer 21, the heat conduction layer 22 and the insulating layer 23 so as to be isolated from the signal transmission layer 24. Further at an end portion of the branched portion 12a, the heat conduction layer 22 exposed from either one of the cover layer 21 or the insulating layer 23 is connected directly to the frame 11. As a result, heat generated in the individual solid-state image sensors 2r, 2g, 2b is transferred to the frame 11 through the heat conduction layer 22.

In the hybrid-functional flexible board 12 having such a structure as shown above, heat generated in the individual solid-state image sensors 2r, 2g, 2b is transferred to the heat conduction layer 22, and further to the casing (e.g., frame 11) of the image pickup device. Consequently, temperature of the solid-state image sensors 2r, 2g, 2b can be reduced. Also in the hybrid-functional flexible board 12 as shown above, image pickup signals generated by the image sensor boards 3r, 3g, 3b are transmitted through the transmission paths contained in the signal transmission layer 24 so as to be inputted to the image control board 31. Moreover in the hybrid-functional flexible board 12, since the heat conduction layer 22 and the signal transmission layer 24 are integrally formed, there is no need for providing a heat conduction route and a signal transmission route independently of each other, making it possible, for example, to prevent the structure inside the image pickup device from being complicated.

In the above description, the signal transmission layer 24 of the hybrid-functional flexible board 12 and the image sensor boards 3r, 3g, 3b are connected by soldering. However, it is also possible that, for example, while portions of the hybrid-functional flexible board 2 corresponding to the image sensor boards 3r, 3g, 3b are increased in thickness, the hybrid-functional flexible board 12 and the image sensor boards 3r, 3g, 3b are formed integrally, i.e., part of the hybrid-functional flexible board 12 is provided by the image sensor boards.

Also as described above, the hybrid-functional flexible board 12 in this embodiment is formed in a five-layer structure. With such a five-layer structure adopted, for example, the total thickness can be reduced, in comparison to cases including a heat radiating sheet in which the heat conduction layer is provided independent of the flexible board that transmits image signals. That is, in such a case where respective members are provided independent of one another, each member needs to be formed in a three-layer structure with inclusion of protective layers on top and bottom faces, i.e., in a totally six-layer structure. In contrast to this, the hybrid-functional flexible board 12 of this embodiment can be provided in a five-layer structure, so that its total thickness can be reduced by at least one layer. That is, the total thickness of members placed between the solid-state image sensors and the image sensor boards, respectively, can be reduced. As a result of this, stress loads added to the solid-state image sensors due to springbacks caused by thermal expansion and thermal contraction can be decreased remarkably.

Accordingly, by adopting the hybrid-functional flexible board 12 having such a structure as in this embodiment, heat generated in the solid-state image sensors 2r, 2g, 2b is transferred to the heat conduction layer 22, and further transferred to the casing of the image pickup device, so that temperature of the solid-state image sensors 2r, 2g, 2b is reduced. Furthermore, since the hybrid-functional flexible board 12 having such a structure is formed so as to be reduced in total thickness as compared with cases in which a heat radiating sheet having a heat conduction layer independent of the flexible board is provided, stress loads added to the solid-state image sensors can be decreased remarkably.

As described above, there can be provided an image pickup device which is capable of reducing stress loads applied to the solid-state image sensors and therefore suppressing deterioration of registration accuracy, while ensuring necessary heat radiation performance, with a relatively simple structure.

It is to be noted that, by properly combining the arbitrary embodiments of the aforementioned various embodiments, the effects possessed by them can be produced.

The image pickup device according to the present invention has an effect of reducing stress loads applied to the solid-state image sensors while ensuring necessary heat radiation performance with a relatively simple structure, thus being useful as an image pickup device or the like for television cameras, video cameras and the like including solid-state image sensors.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The entire disclosure of Japanese Patent Application No. 2007-241947 filed on Sep. 19, 2007, including specification, claims, and drawings, is incorporated herein by reference in its entirety.

What is claimed is:

1. An image pickup device comprising:
   a color separation prism made up of a plurality of prism members, for separating light into a plurality of color components;
   a plurality of solid-state image sensors fixed to the plurality of prism members, respectively;
   a plurality of image sensor boards on which the plurality of solid-state image sensors are mounted, respectively;
   an image control board to which image pickup signals generated by the plurality of image sensor boards, respectively, are inputted; and
   a flexible board connected to the image control board, wherein
   the flexible board comprises
      a signal transmission layer which is connected to each of the plurality of image sensor boards and which forms transmission paths for transmitting the image pickup signals to the image control board,
      a heat radiating layer, formed of a high heat conductivity material, which is put into contact with each of the plurality of solid-state image sensors to transfer heat generated in the solid-state image sensors from the image sensors,
      an insulating layer which is placed interveniently between the signal transmission layer and the heat conduction layer to fix the signal transmission layer and the heat conduction layer to each other, and
      a protective layer fixed to surfaces of the signal transmission layer and the heat conduction layer, respectively.

2. The image pickup device as defined in claim 1, wherein end portions of the flexible board are placed between the solid-state image sensors and the image sensor boards having the solid-state image sensors mounted thereon, respectively,
   at the end portions of the flexible board, the signal transmission layer exposed from the protective layer is connected to each of the plurality of image sensor boards and moreover the heat conduction layer exposed from the protective layer is put into contact with each of the plurality of solid-state image sensors.

3. The image pickup device as defined in claim 2, wherein the heat conduction layer is connected to a casing of the image pickup device.

* * * * *

UNITED STATES PATENT AND TRADEMARK OFFICE
CERTIFICATE OF CORRECTION

PATENT NO.         : 8,045,041 B2
APPLICATION NO.    : 12/211994
DATED              : October 25, 2011
INVENTOR(S)        : Shinya Ogasawara et al.

Page 1 of 1

It is certified that error appears in the above-identified patent and that said Letters Patent is hereby corrected as shown below:

Title Page, Item (56) References Cited, under the "FOREIGN PATENT DOCUMENTS" heading, please insert the following documents:

--JP 3658945      6/2005
  JP 3667022      7/2005--

Signed and Sealed this
Twenty-eighth Day of February, 2012

David J. Kappos
*Director of the United States Patent and Trademark Office*